United States Patent [19]

Mehnert et al.

[11] Patent Number: 5,800,707
[45] Date of Patent: Sep. 1, 1998

[54] WATER FILTER

[75] Inventors: Hans-Jurgen Mehnert, Solingen; Erich Hoffmann, Bergish Gladbach; Dorothea Pytlik, Solingen, all of Germany

[73] Assignee: Robert Krups GmbH & Co. KG, Solingen, Germany

[21] Appl. No.: 594,831

[22] Filed: Jan. 31, 1996

[30] Foreign Application Priority Data

Jan. 31, 1995 [FR] France ..................... 95 01132

[51] Int. Cl.$^6$ ............... C02F 1/28; C02F 1/42; A47J 31/06; A47J 31/24
[52] U.S. Cl. ............ 210/232; 210/266; 210/282; 210/283; 210/284; 210/464; 210/473; 210/477; 210/481; 210/482; 99/286; 99/306
[58] Field of Search ................ 210/266, 282, 210/283, 284, 482, 477, 455, 464, 465, 466, 467, 468, 469, 470, 471, 473, 481, 232; 99/286, 290, 306

[56] References Cited

U.S. PATENT DOCUMENTS

| | | | |
|---|---|---|---|
| 307,969 | 11/1884 | Manning | 210/474 |
| 445,224 | 1/1891 | Knight | 210/476 |
| 576,798 | 2/1897 | Baldwin | 210/482 |
| 587,438 | 8/1897 | Irwin | 210/474 |
| 1,284,587 | 11/1918 | Bylander | 210/466 |
| 2,263,610 | 11/1941 | Cain | 99/286 |
| 2,625,271 | 1/1953 | Flanigan | 210/471 |
| 2,677,465 | 5/1954 | Meyer | 210/482 |
| 2,747,739 | 5/1956 | Bissonnette et al. | 210/482 |
| 2,874,846 | 2/1959 | Herster | 210/232 |
| 3,174,325 | 3/1965 | Serio | 99/299 |
| 3,206,031 | 9/1965 | Messa | 210/482 |
| 3,300,048 | 1/1967 | Pollock | 210/482 |
| 3,327,859 | 6/1967 | Pall | 210/266 |
| 3,764,017 | 10/1973 | Dover | 210/481 |
| 3,844,206 | 10/1974 | Weber | 99/282 |
| 4,301,010 | 11/1981 | Eddleman et al. | 210/476 |
| 4,491,520 | 1/1985 | Jaye | 210/482 |
| 4,689,147 | 8/1987 | Leoncavallo et al. | 210/482 |
| 4,749,481 | 6/1988 | Wheatley | |
| 4,764,274 | 8/1988 | Miller | 210/232 |
| 4,828,692 | 5/1989 | Peranio | 210/266 |
| 4,859,348 | 8/1989 | Jusaitis et al. | 210/481 |
| 4,889,041 | 12/1989 | Mahlick et al. | 99/285 |
| 4,969,393 | 11/1990 | Mahlick et al. | 99/286 |
| 5,038,675 | 8/1991 | Hartel | 99/286 |
| 5,039,402 | 8/1991 | Himelstein | 210/266 |
| 5,186,830 | 2/1993 | Rait | 210/477 |
| 5,225,078 | 7/1993 | Polasky et al. | 210/482 |
| 5,308,483 | 5/1994 | Sklar et al. | 210/232 |
| 5,370,041 | 12/1994 | Lowe | 210/282 |
| 5,393,548 | 2/1995 | Heiligman | 210/282 |
| 5,395,515 | 3/1995 | Ford | 210/477 |
| 5,503,740 | 4/1996 | Callaghan et al. | 210/465 |
| 5,505,120 | 4/1996 | Albertson | 210/282 |
| 5,635,063 | 6/1997 | Rajan et al. | 210/282 |
| 5,652,008 | 7/1997 | Heiligman | 210/282 |

FOREIGN PATENT DOCUMENTS

| 30 14 493 | 4/1980 | Germany |
| WO 92/16136 | 10/1992 | WIPO |

OTHER PUBLICATIONS

Rapport De Recherche Europeenne No. EP 96 40 0128 Jun. 10, 1996.

*Primary Examiner*—Cynthia L. Nessler
*Attorney, Agent, or Firm*—Darby & Darby

[57] ABSTRACT

The present invention concerns a water filter designed to be inserted into a drinking water circuit. The water filter has a support designed to house removably one or more different filters each having a different filtering property and adapted to be mounted either independently of each other or associated in a particular combination so as to effect a filtration of the drinking water according to its composition.

8 Claims, 3 Drawing Sheets

WATER FILTER

BACKGROUND OF THE INVENTION

1. Field of the Invention

The present invention concerns a water filter designed to be inserted in a drinking water circuit.

2. Discussion of the Art

The water filters known in the prior art use either predetermined chemical or electrochemical processes or magnetic processes. In both cases, these filters require installations of complex and costly design, intended for a single type of treatment of the drinking water. However, the nature of the drinking water depends on its composition, which varies according to several factors specific to each region such as, for example, the nature of the soil or the industrial and agricultural activity. Thus the filters of the prior art become completely ineffective in regions where the normal drinking water contains several types of impurity.

SUMMARY OF THE INVENTION

The aim of the invention is to remedy this drawback by producing a filter which is of simple and inexpensive design and affords wider possibilities of use, eliminating a greater variety of impurities present in the water to be treated, and which is adapted to be used effectively in several different regions.

According to the invention, the water filter has a support designed to house removably one or more different filtration means each having a different filtering property and adapted to be mounted either independently of each other on the said support or associated in a particular combination so as to effect a filtration of the said drinking water according to its composition.

By virtue of the filter according to the invention, the treatment of the water is effected by a single type of filtration means where the water to be treated contains a single type of impurity and by several types of judiciously combined filtration means where the said water contains several types of impurity. In addition, the modular character of the filter according to the invention makes it suitable for being used in several different regions and within the framework of several different applications both in small items of domestic electrical equipment and in the supply circuit to installations of an industrial or scientific research nature requiring the use of treated water.

According to another characteristic of the invention, each filtration means has a particular chemical composition with a specific reaction adapted to a particular treatment of the drinking water used.

Thus, according to the composition of the water to be treated, the user fixes, in the said support, one or more different filtration means each having a chemical composition adapted to bring about the elimination of a particular type of impurity contained in the water to be treated.

BRIEF DESCRIPTION OF THE DRAWINGS

Other characteristics and advantages of the invention will moreover emerge from the description which follows, by way of non-limitative example, with reference to the accompany drawings in which.

DETAILED DESCRIPTION OF THE INVENTION

The filter of the invention is designed to be inserted in a drinking water circuit, for example between a tap or a reservoir and a utilisation circuit.

Figure 2:
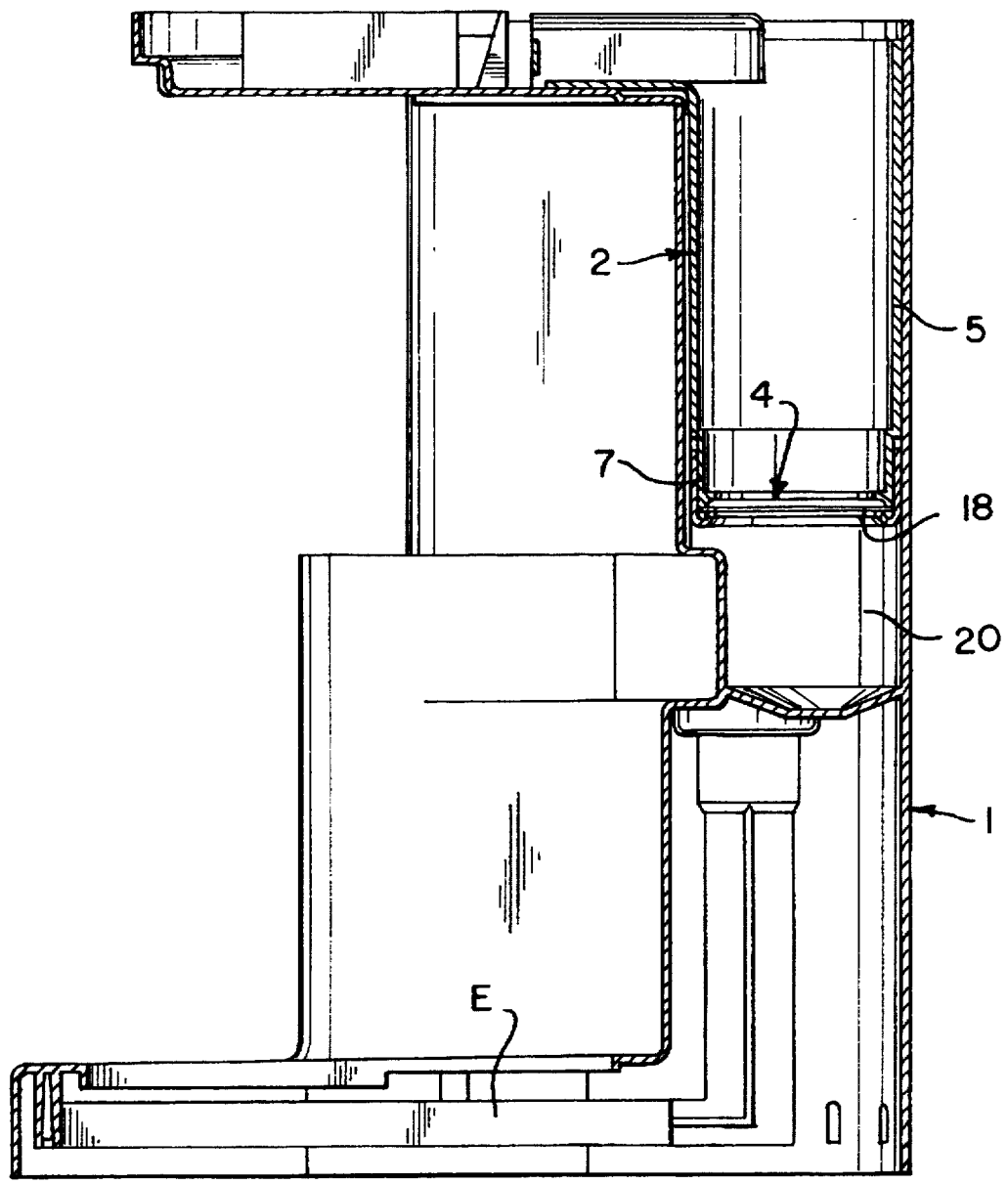
FIG. 2 is a view in vertical section to a smaller scale along the line 2—2 in FIG. 1 in which the filter is inserted in the water reservoir of a cafetiere.

In the particular application illustrated in FIG. 2, the water filter is inserted in a drinking water circuit supplying a cafetiere including a water reservoir 1 connected to a water heater E. Within the scope of this application, the said filter is arranged upstream of the water heater E.

Figure 1:
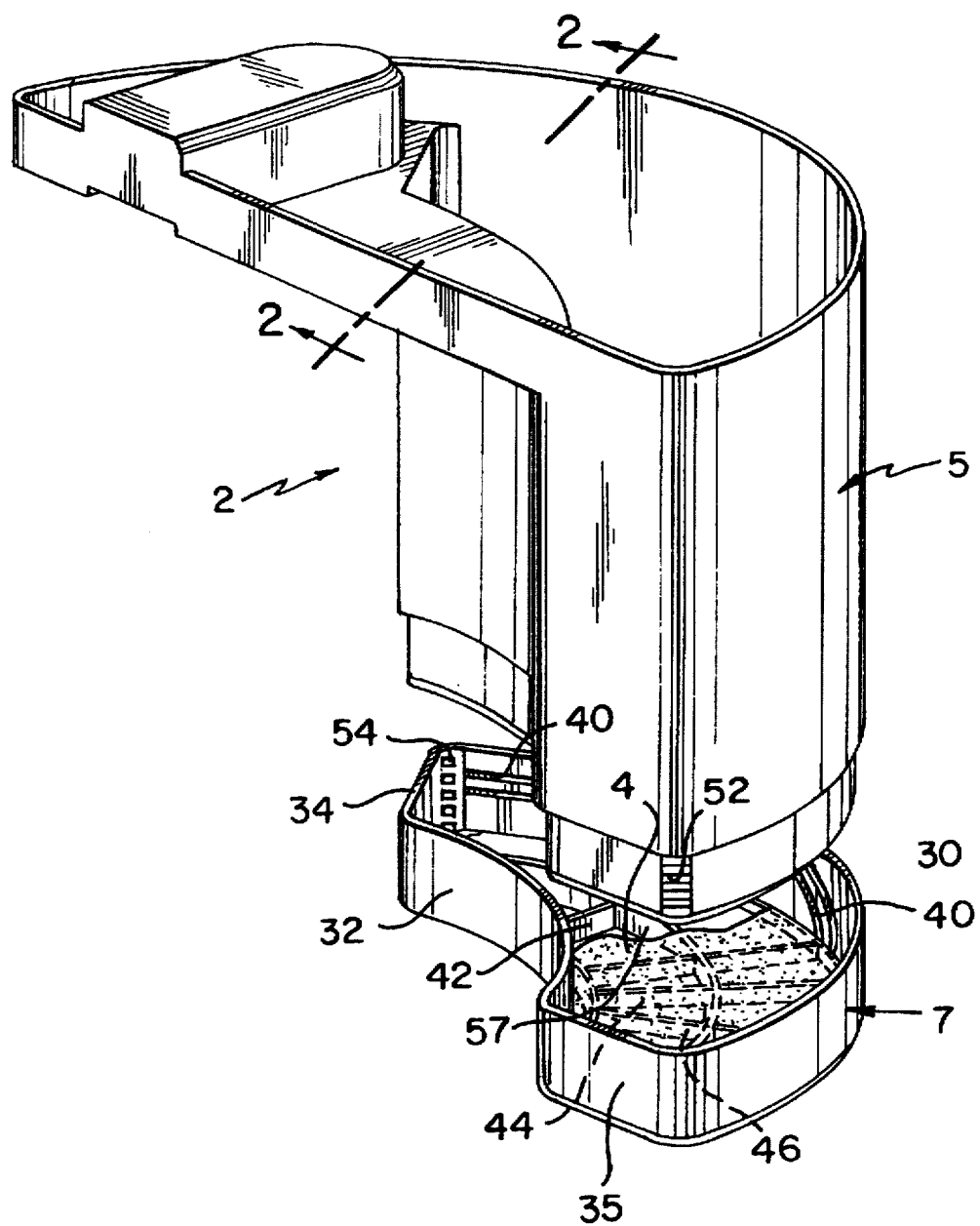
FIG. 1 is a perspective view showing a first embodiment of a water filter according to the invention designed to be fitted to a cafetiere.
Figure 3:
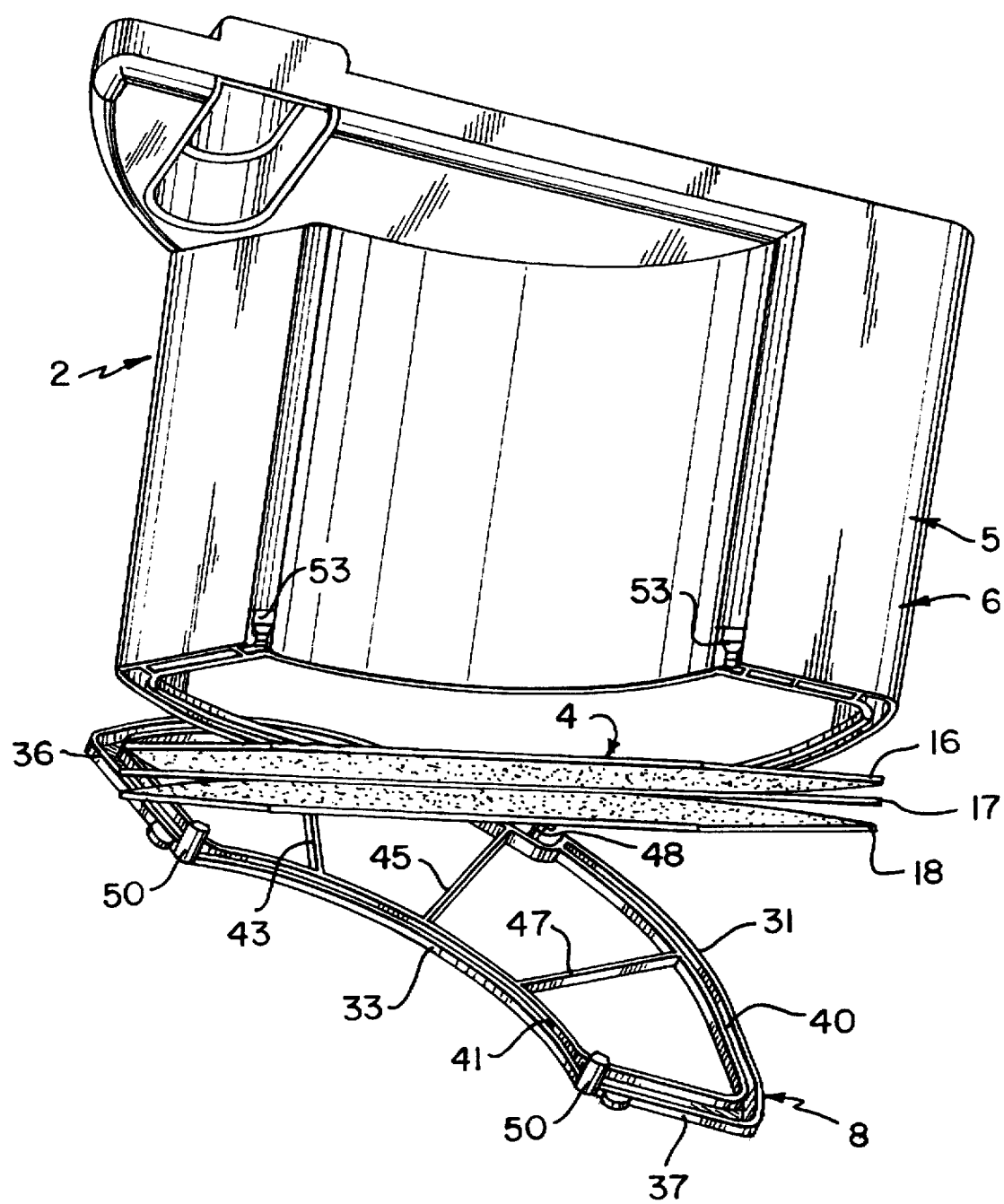
FIG. 3 is a perspective view showing a second embodiment of a filter according to the invention.

According to the invention, and as can be seen in FIGS. 1 to 3, the water filter has a support 2 designed to house removably one or more different filtration means 4 each having a different filtering property and adapted to be mounted either independently of each other or associated in a particular combination so as to effect a filtration of the drinking water according to its composition.

As can be seen best in FIGS. 1 and 3, the support has a frame formed by two parts, that is to say a first part (5; 6) and a second part (7; 8) connected together by adjustable clamping means so as to allow the holding of a filtration means 4 and the holding of a stack of filtration means 4. As can be seen best in FIG. 3, in which the depiction has been limited to three filtration means, each filtration means 4 consists of a sheet (16, 17, 18) which is arranged transversely to the flow in the feed water circuit. With such a structure, the user is able to adjust the treatment of the drinking water according to the impurities to be eliminated by fixing, to the said support 2, the sheet 16 or 17 or 18 or the combination of sheets (16, 17, 18) adapted to produce a filtration of the water used with a view to eliminating therefrom, during the same filtration operation, the different types of impurity.

According to one important characteristic of the invention, each filtration means has a particular chemical composition having a specific reaction adapted to a particular treatment of the drinking water used. Naturally a filtration means can also be of the mechanical type, that is to say it may have a sufficiently fine structure to retain for example scale and solid impurities.

Thus, where the drinking water contains limestone or pesticides such as nitrates, one or more of the filtering sheets 4 will consist of ion exchange materials. For example, for limestone, a "cationic exchanger" filter will be used and for nitrates an "anionic exchanger" filter.

Where the drinking water contains organic impurities such as chlorides, one or more of the filtering sheets 4 will consist of an activated carbon. As stated previously, the different filtering sheets 4 can be used independently of each other or associated in a particular combination when the water to be treated contains several types of impurity requiring several conjoint treatments. As is known per se, each sheet (16, 17, 18) has a saturation indicator, not shown, enabling the user to change the filtering sheet or sheets (16, 17, 18) simply when they are saturated. In a particularly interesting embodiment of the invention, each sheet is manufactured from a non-woven rot-proof material treated chemically so as to have the desired chemical characteristics.

Naturally the above-mentioned treatments are in no way limitative since the water filter according to the invention can include other filtration means having other chemical compositions and able to have different forms adapted to the environment in which the filter is used. The latter can, for example, include cartridges containing different filtering substances and disposed removably in a structure having a form adapted to the environment in which the said filter is used.

Referring notably to FIG. 2, the support 2 has the form of a hollow body, whose casing partly matches the shape of the water reservoir 1 so as to enable the support 2 to be fitted in, and whose base includes the filtering sheets 16, 17, 18. The said support 2 is arranged in the water reservoir 1 at a distance from the bottom of the latter so as to form an intermediate reservoir 20 between the said bottom and the bottom sheet 18 mounted in the support 2. The intermediate reservoir 20 is designed to contain the filtered water which flows downstream of the filter and which is then sent to the utilisation circuit through pipes arranged in the bottom of the intermediate reservoir 20. According to a preferred embodiment of the invention, the sheets (16, 17, 18) extend over practically the entire extent of the base of the support 2 and consequently over the entire extent of the reservoir 1.

As can be seen in FIGS. 1 and 3, the first part (5; 6) and the second part (7; 8) of the support 2 for the filtering sheets (16, 17, 18) are formed by a curved structure of trapezoidal shape overall. The said second part (7; 8) has a first side (30; 31) in the shape of an arc of a circle and a second side (32; 33) parallel to the first side (30; 31) and with a length shorter than that of the latter. The respective ends of the first side (30; 31) and of the second side (32; 33) are connected respectively by two symmetrical lateral edges (34, 36) and (35, 37). In the embodiment illustrated in FIG. 2 and in FIG. 3, the said first side (30; 31) and second side (32; 33) have on their respective internal faces grooves (40; 41) designed to house the edges of the filtering sheets (17, 17, 18). In order to prevent the said sheets (16, 17, 18) coming loose under the action of the water passing through them, the frame has at least three transverse ribs (42, 44, 46) and (43, 45, 47) arranged in the second part (7, 8) and connecting the first side (30; 31) and the second side (32; 33). These ribs serve as a support grid for the said filtering sheets (16, 17, 18) and/or supplementary mechanical sheets.

According to a first, embodiment illustrated in FIG. 1, the said clamping means are formed by a translational-movement device having on the first part 5 a series of notches 52 and on the second part 7, opposite the said notches 52, a series of elastic lugs 54. According to this embodiment, in order to reinforce the support grid for the filtering sheets (16, 17, 18), the transverse ribs (42, 44, 46) are connected by an arch 57 parallel to the first side 31 and to the second side 33.

According to a second embodiment illustrated in FIG. 3, the clamping means for holding the sheets are formed by an articulation device having, on the first side 31 of the frame, a hinge 48, and on the second side 33 at least one elastic-attachment cramp 50. In the embodiment illustrated, the cramps are two in number and hook onto the notches 53 carried by the part 6.

This device affords on the one hand a sure locking of the filtration means 4 in the support 2 and on the other hand simple manipulation for replacing and/or cleaning the filtering sheets (16, 17, 18).

By virtue of the modular character of the filter according to the invention, the filtration of drinking water can be effected "a la carte" according to the impurities to be eliminated and the health legislation in the different countries. In addition the filter according to the invention enables the normal drinking water to be adapted to the taste of the consumer, which is very important for producing good coffee.

We claim:

1. An apparatus for selectively filtering water, said apparatus inserted between a water source and a water utilization point in a water circuit, said circuit is in a cafetiere, said circuit having a water reservoir connected to a water heater, and said apparatus is upstream of said water heater, said apparatus comprising:

filtration means having a filtering property, said filtering property selected to affect filtration of the water according to a composition of the water to be filtered, said filtration means having a thickness variable according to said selected filtering property; and a support having first and second facing frames, said first and second frames defining corresponding aligned openings, said first and second frames having corresponding facing surfaces and said first and second frames connected by clamping means, said clamping means adjustable so that said first frame is positionable with respect to said second frame to accommodate said thickness of said filtration means, said filtration means dimensioned to be larger than said corresponding aligned openings, said filtration means removably secured between said first and second frames by positioning said frames with said adjustable clamping means so that portions of said filtration means are clamped between portions of said corresponding facing surfaces of said first and second frames, wherein said reservoir has a bottom end, and said support is positioned in said reservoir at a distance from said reservoir bottom end, such that a portion of said reservoir between said support and said reservoir bottom end forms an intermediate reservoir between said bottom end and said support, said support being dimensioned to closely fit inside said reservoir, and said first frame of said support comprising a vertically extending hollow body having a base end, said second frame of said support being secured to said base end so that said corresponding aligned openings of said first and second frames and said filtration means are positioned in said base end, and said aligned openings and said filtration means substantially dimensionally correspond to said bottom of said reservoir.

2. The apparatus according to claim 1 wherein said clamping means comprises a hinge connecting a respective first side of each of said first and second frames and said clamping means further comprises an elastic cramp connecting an opposite respective side of each of said first and second frames.

3. The apparatus according to claim 1 wherein said clamping means comprises a series of notches on said first frame cooperatively engaging corresponding elastic lugs on said second frame.

4. The apparatus according to claim 1 wherein said filtration means comprises a plurality of sheets arranged transversely to the flow of water in said circuit, each of said plurality of sheets having a filtering property selected to affect filtration of said water according to a particular combined of said water composition, such that sheets having different filtering properties can be component to affect filtration of several components of said water passing through said filtration means.

5. The apparatus according to claim 1 wherein said filtration means has a chemical composition producing said filtering property.

6. The apparatus according to claim 5 wherein said chemical composition comprises activated carbon.

7. The apparatus according to claim 5 wherein said chemical composition comprises an ion exchange material.

8. The apparatus according to claim 7 wherein said filtration means comprises a sheet arranged transversely to a flow of water in said circuit.

* * * * *